United States Patent [19]

Lin

[11] Patent Number: 6,159,580
[45] Date of Patent: Dec. 12, 2000

[54] FLEXIBLE PLATE DEVICE

[76] Inventor: Tsong-Yow Lin, 58, Ma Yuan West St., Taichung, Taiwan

[21] Appl. No.: 09/267,206

[22] Filed: Mar. 12, 1999

[51] Int. Cl.⁷ .................................. B32B 3/06; B32B 3/28

[52] U.S. Cl. ............................. 428/167; 428/99; 428/172

[58] Field of Search .............................. 428/99, 167, 172, 428/188, 192; 52/311.1

[56] References Cited

U.S. PATENT DOCUMENTS

| | | | |
|---|---|---|---|
| 1,653,592 | 12/1927 | Stratman | 428/167 |
| 3,042,562 | 7/1962 | Peterson | 428/167 |

*Primary Examiner*—Donald Loney

[57] ABSTRACT

An improved flexible plate device has a plastic plate and two connection bars. A plurality of linear grooves are formed on the plastic plate. Each of the connection bars is enclosed by a respective end of the plastic plate. Each of the connection bars has a triangular cross-section. Each of the connection bars has a threaded hole.

4 Claims, 9 Drawing Sheets

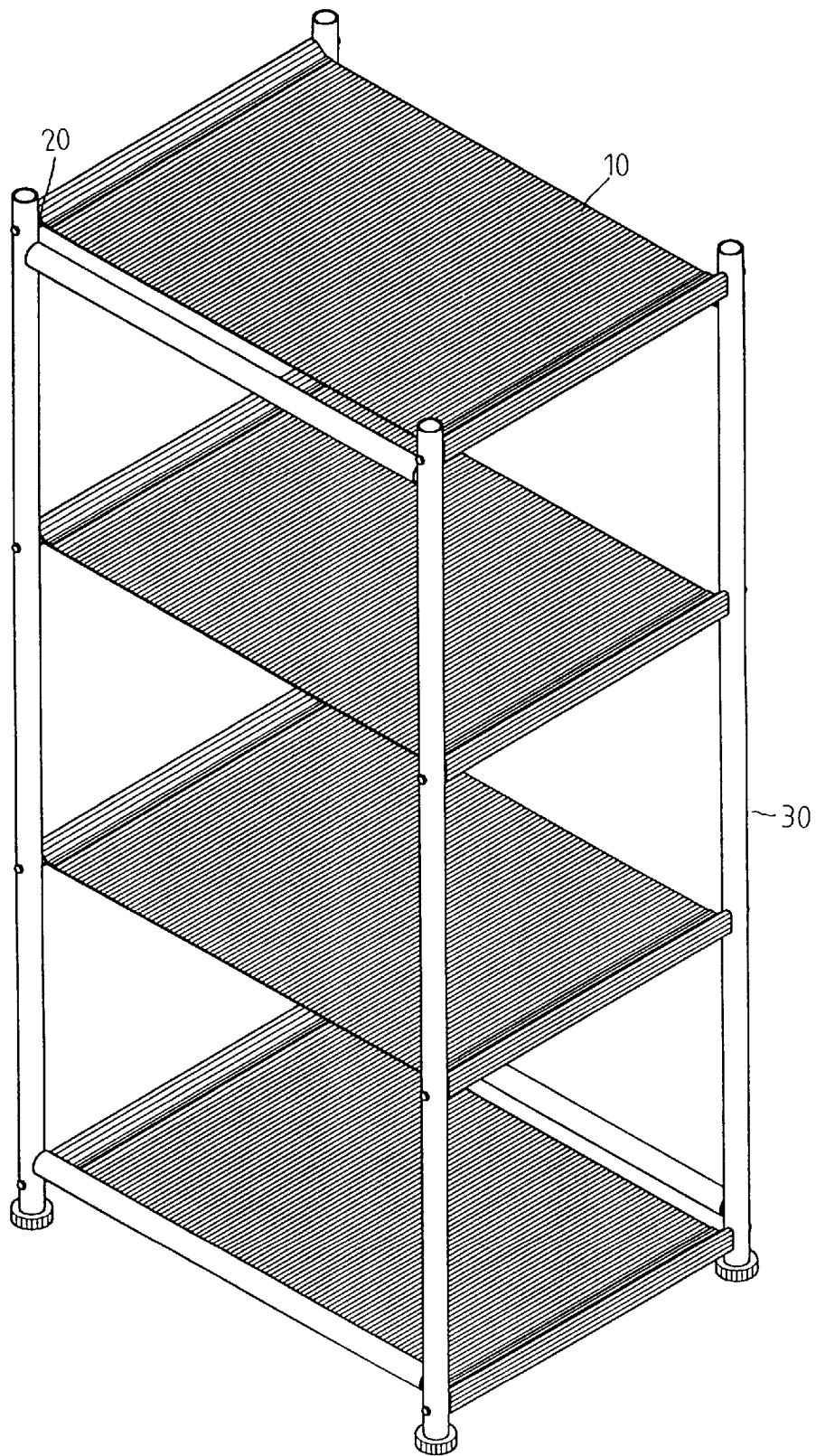
F I G. 3

FLEXIBLE PLATE DEVICE

BACKGROUND OF THE INVENTION

The present invention relates to an improved flexible plate device. More particularly, the present invention relates to an improved flexible plate device which can be bent.

A conventional hard plate cannot be bent at all. The user has to buy many conventional hard plates in order to form a shelf.

SUMMARY OF THE INVENTION

An object of the present invention is to provide an improved flexible plate device which can be bent to form various shapes.

Accordingly, an improved flexible plate device comprises a plastic plate and two connection bars. A plurality of linear grooves are formed on the plastic plate. Each of the connection bars is enclosed by a respective end of the plastic plate. Each of the connection bars has a threaded hole.

BRIEF DESCRIPTION OF THE DRAWINGS

FIG. 3 is a perspective assembly view of a plurality of improved flexible plate devices of a first preferred embodiment disposed on a frame;

DETAILED DESCRIPTION OF THE INVENTION

Figure 1:
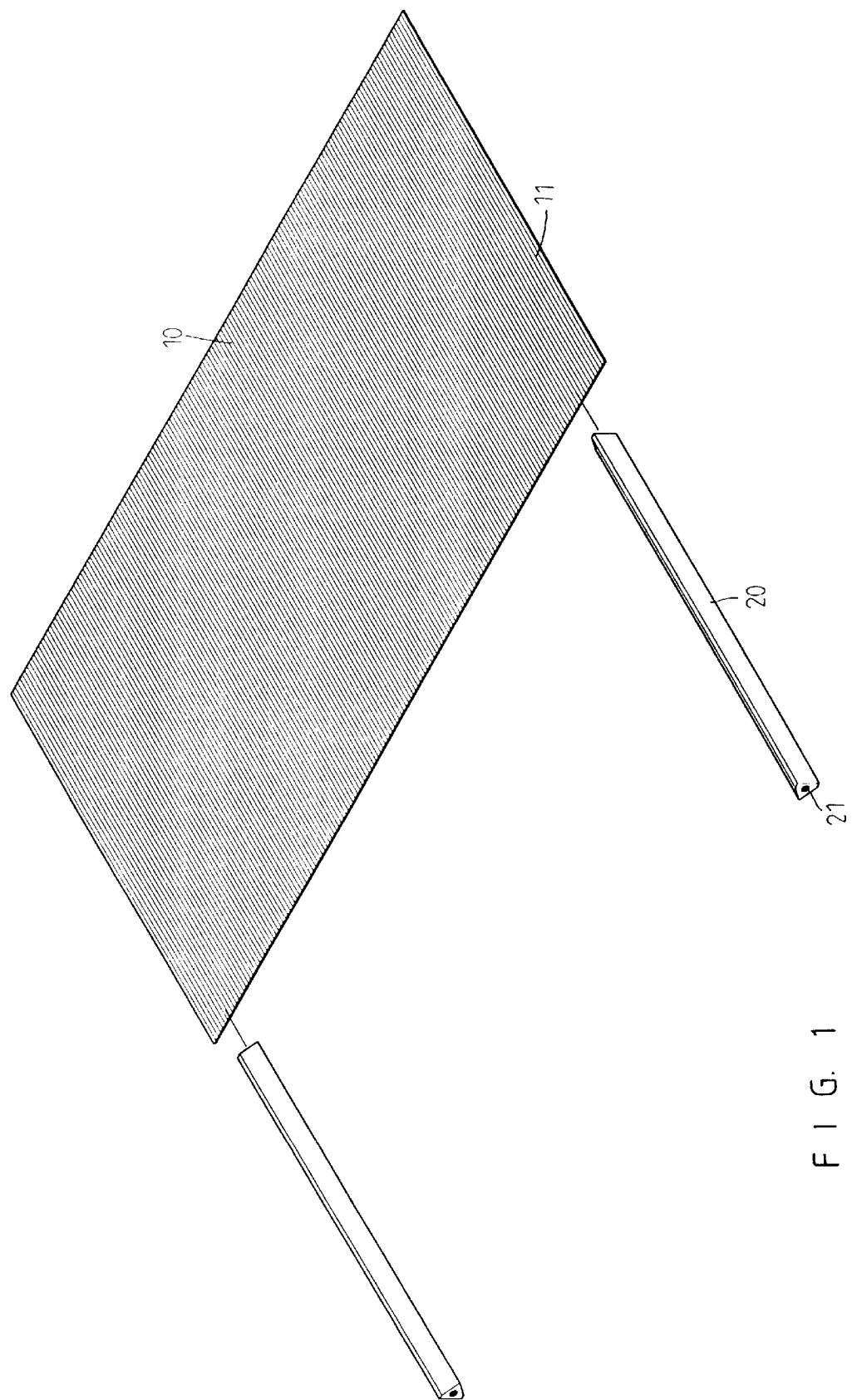
FIG. 1 is a perspective exploded view of an improved flexible plate device of a first preferred embodiment in accordance with the present invention.
Figure 2:
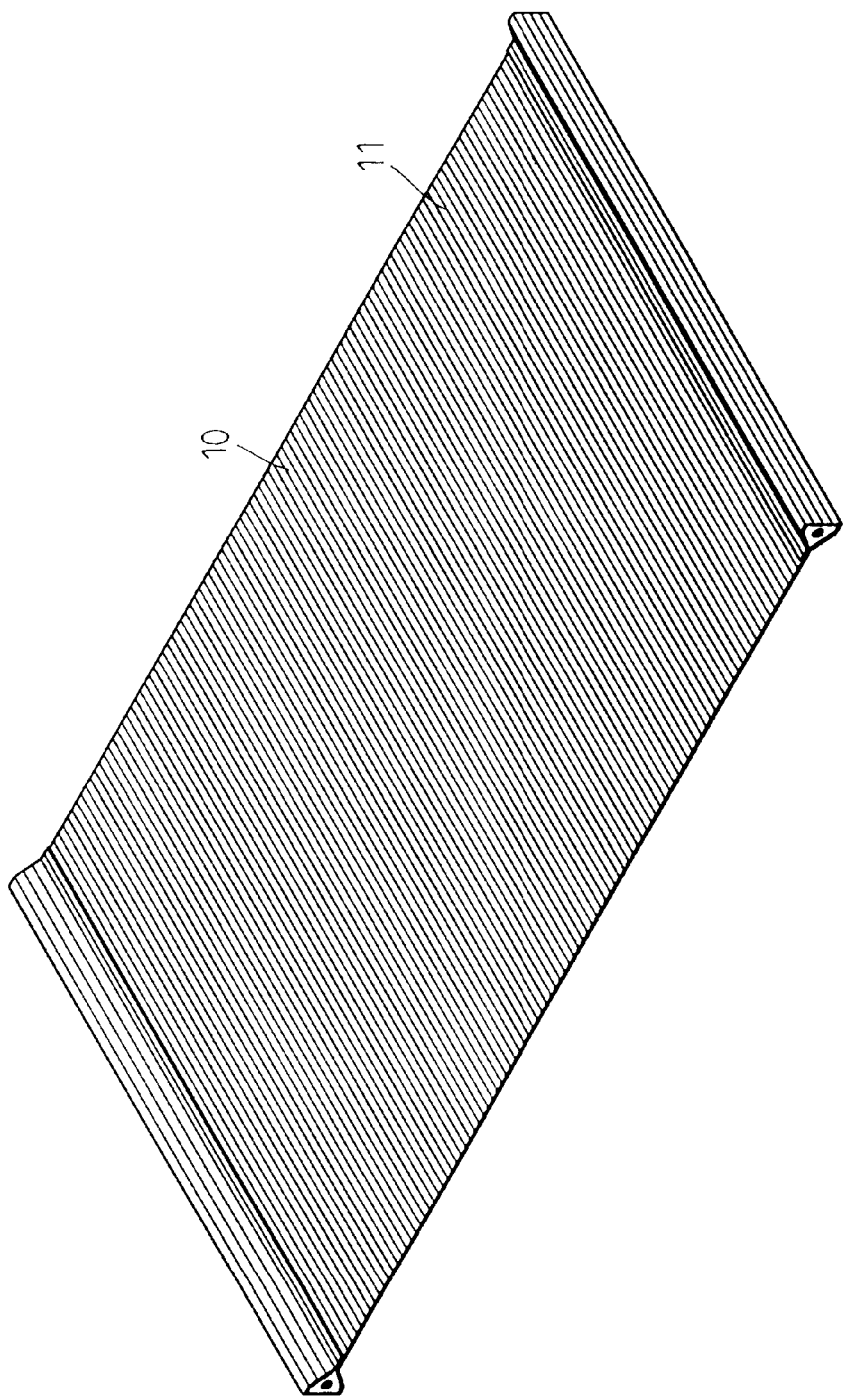
FIG. 2 is a perspective assembly view of an improved flexible plate device of a first preferred embodiment in accordance with the present invention.

Referring to FIGS. 1 and 2, a first improved flexible plate device comprises a plastic plate 10 and two connection bars 20. A plurality of linear grooves 11 are formed on the plastic plate 10. Each of the connection bars 20 is enclosed by a respective end of the plastic plate 10. Each of the connection bars 20 has a triangular cross-section. Each of the connection bars 20 has a threaded hole 21.

Each of the connection bars 20 and the respective end of the plastic plate 10 are adhered together by a high frequency method.

Referring to FIG. 3, a plurality of first improved flexible plate devices are disposed on a frame 30.

Figure 4:
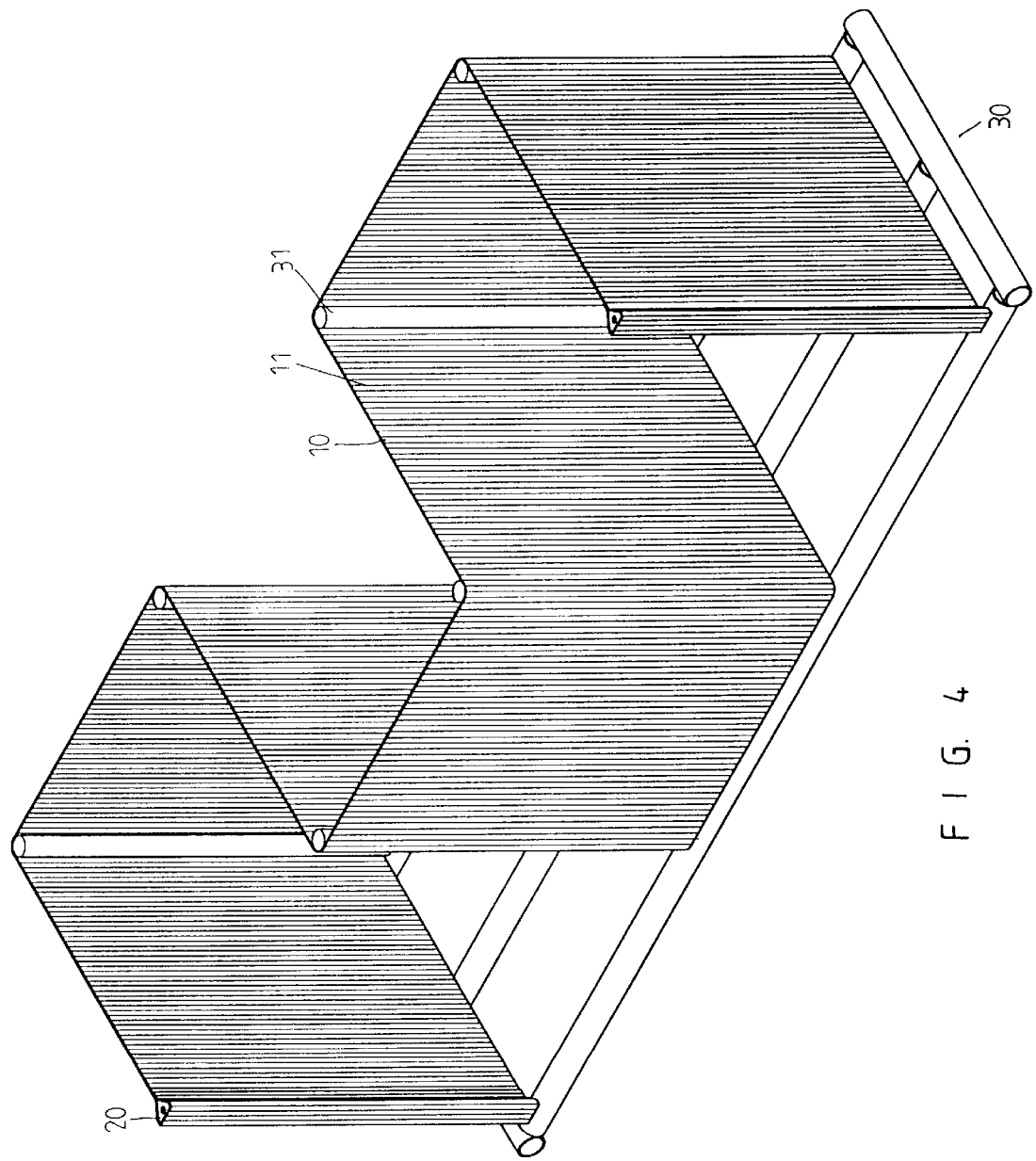
FIG. 4 is a schematic view illustrating a first application of an improved flexible plate device of a first preferred embodiment in accordance with the present invention.

Referring to FIG. 4, a plurality of rods 31 support the plastic plate 10. The plastic plate 10 is disposed on a frame 30.

Figure 5:
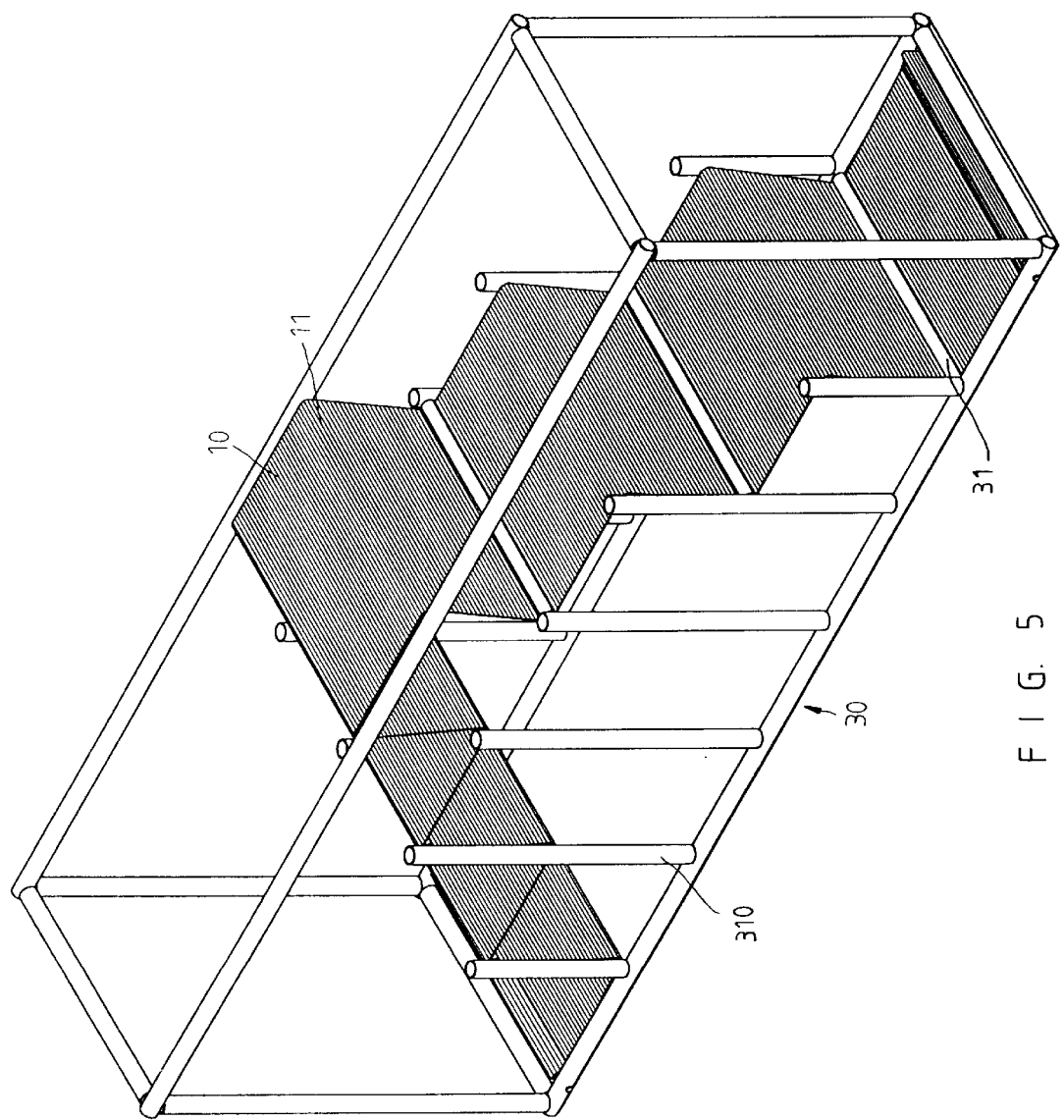
FIG. 5 is a schematic view illustrating a second application of an improved flexible plate device of a first preferred embodiment in accordance with the present invention.

Referring to FIG. 5, a plurality of rods 31 support the plastic plate 10. A frame 30 has at least two support posts 310 to support each rod 31.

Figure 6:
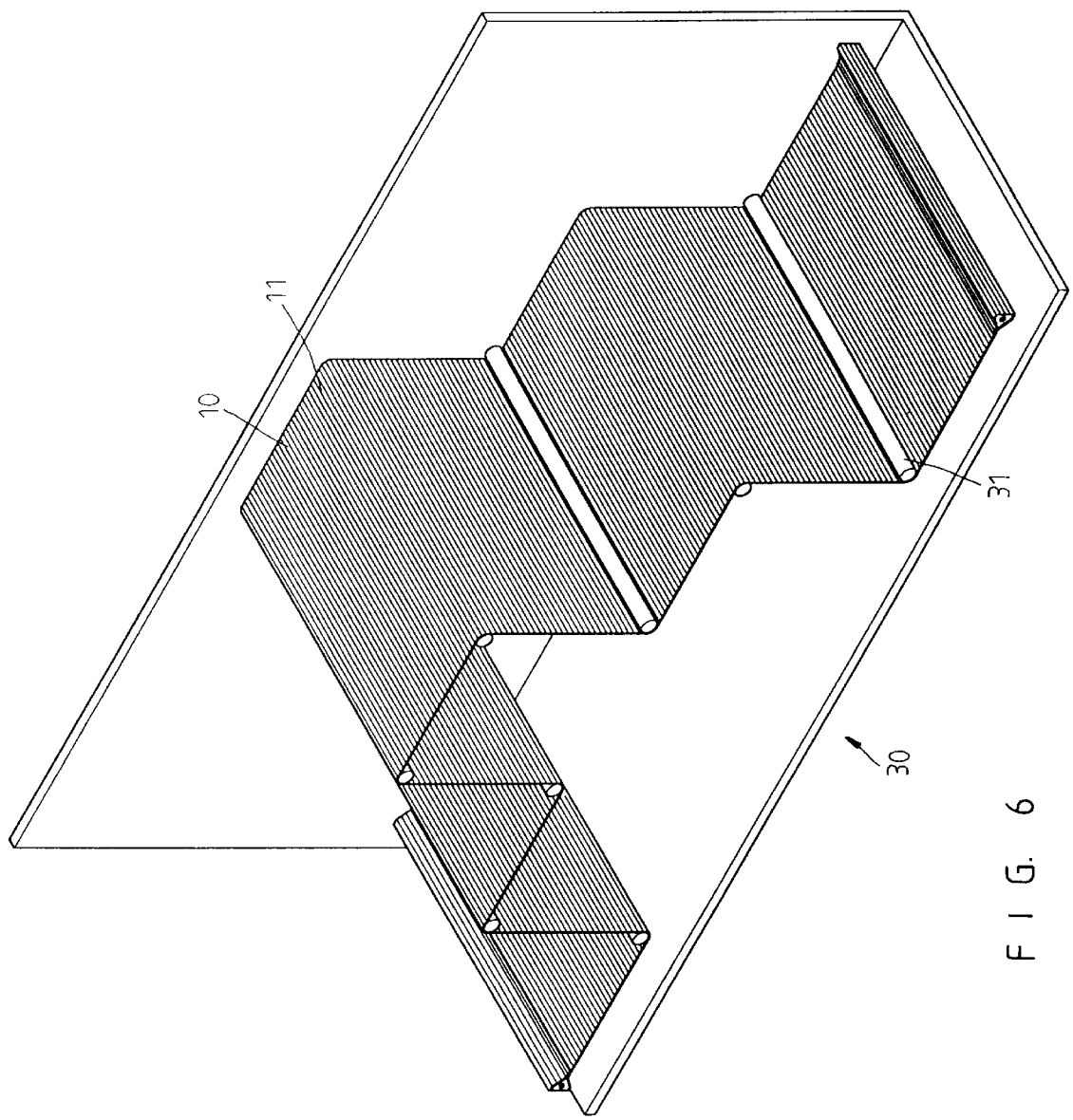
FIG. 6 is a schematic view illustrating a third application of an improved flexible plate device of a first preferred embodiment in accordance with the present invention.

Referring to FIG. 6, a plurality of rods 31 support the plastic plate 10. The plastic plate 10 is disposed on a frame 30.

Figure 7:
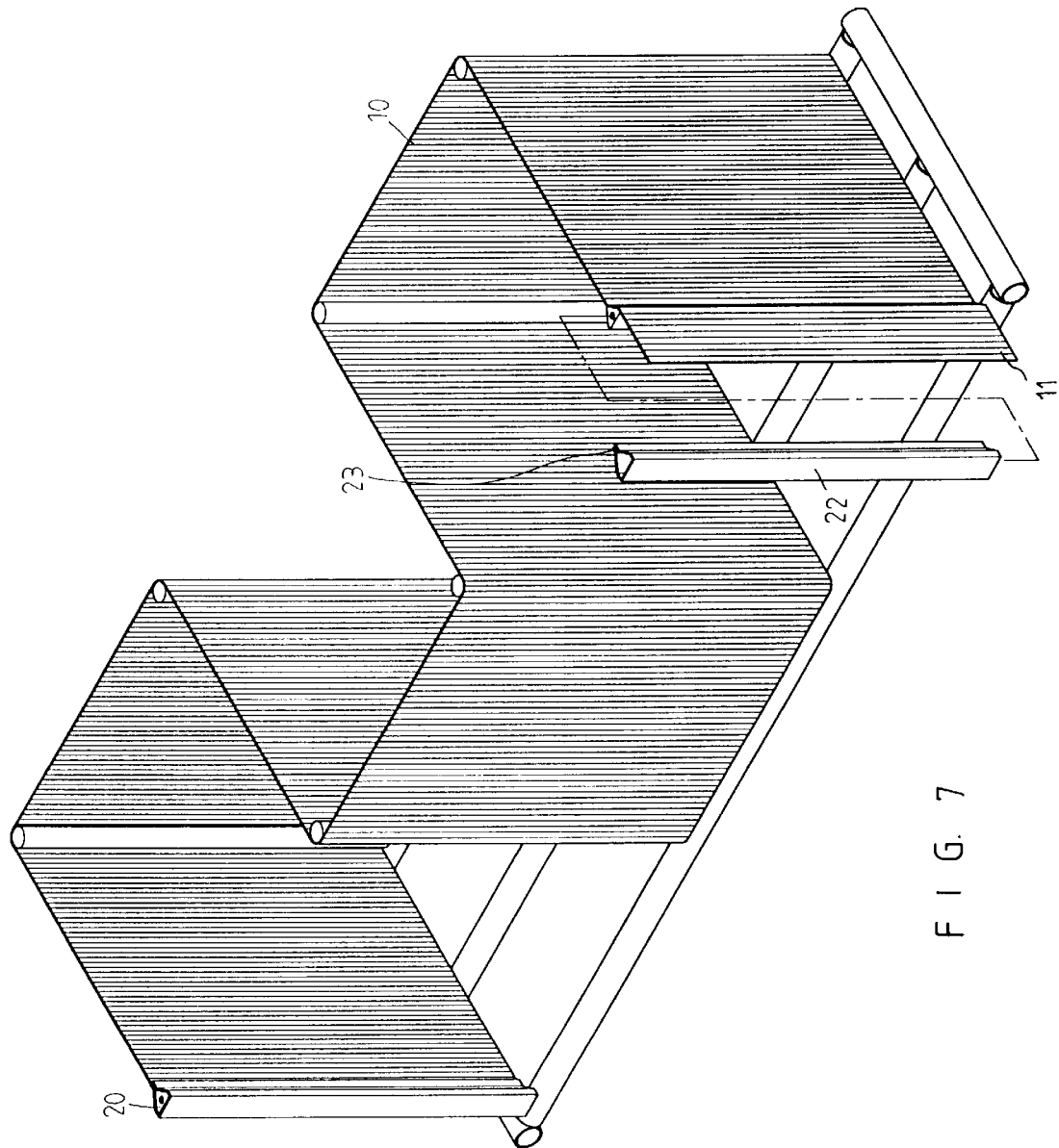
FIG. 7 is a perspective view of an improved flexible plate device of a second preferred embodiment in accordance with the present invention.

Referring to FIG. 7, a second improved flexible plate device comprises a plastic plate 10 and two connection bars 20. A plurality of linear grooves 11 are formed on the plastic plate 10. Each of the connection bars 20 is enclosed by a hollow casing 22. The hollow casing 22 has a slot 23. Each hollow casing 22 is enclosed by a respective end of the plastic plate 10. Each of the connection bars 20 has a triangular cross-section.

Figure 8:
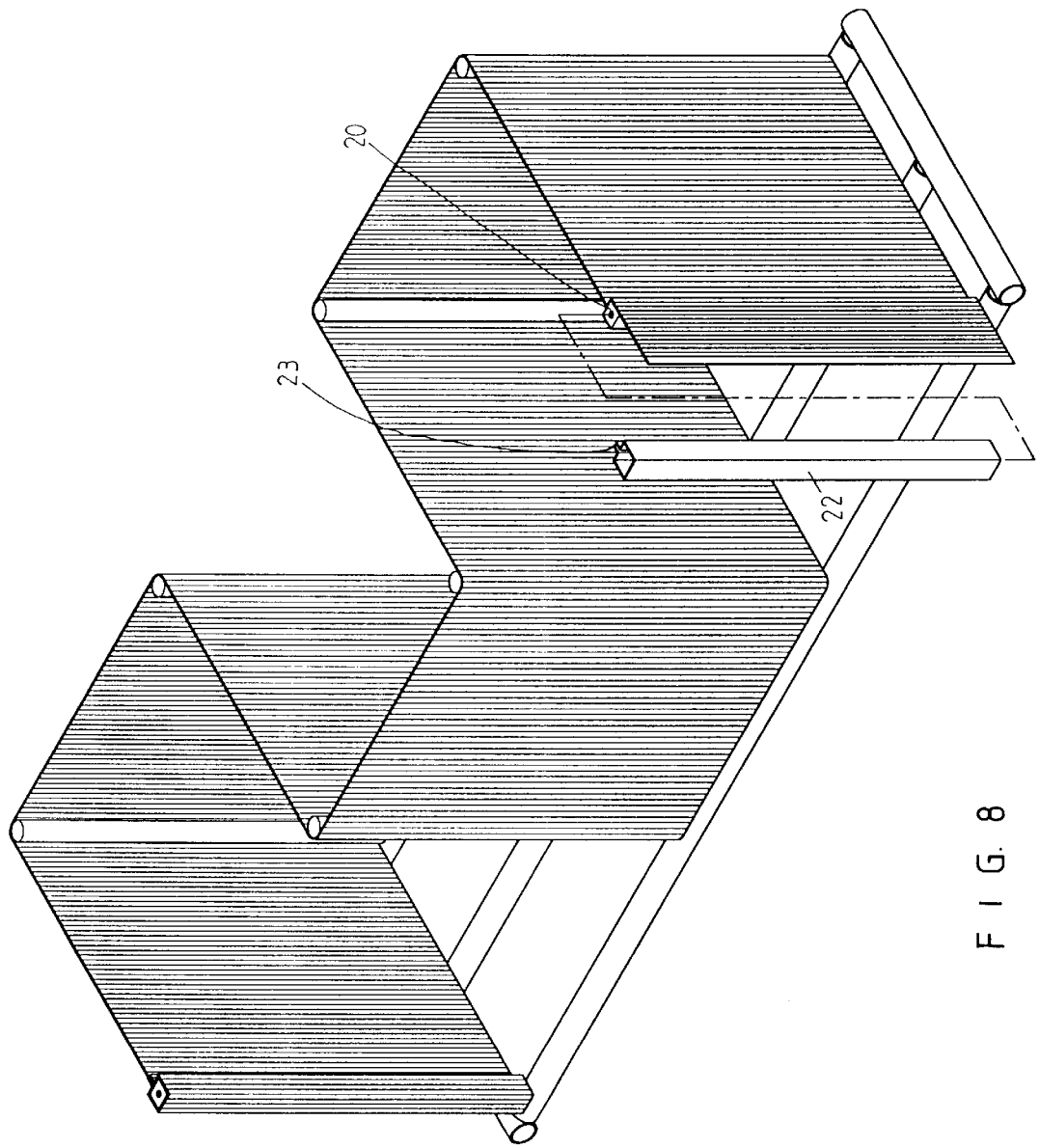
FIG. 8 is a perspective view of an improved flexible plate device of a third preferred embodiment in accordance with the present invention.

Referring to FIG. 8, a third improved flexible plate device comprises a plastic plate 10 and two connection bars 20. A plurality of linear grooves 11 are formed on the plastic plate 10. Each of the connection bars 20 is enclosed by a hollow casing 22. The hollow casing 22 has a slot 23. Each hollow casing 22 is enclosed by a respective end of the plastic plate 10. Each of the connection bars 20 has a square cross-section.

Figure 9:
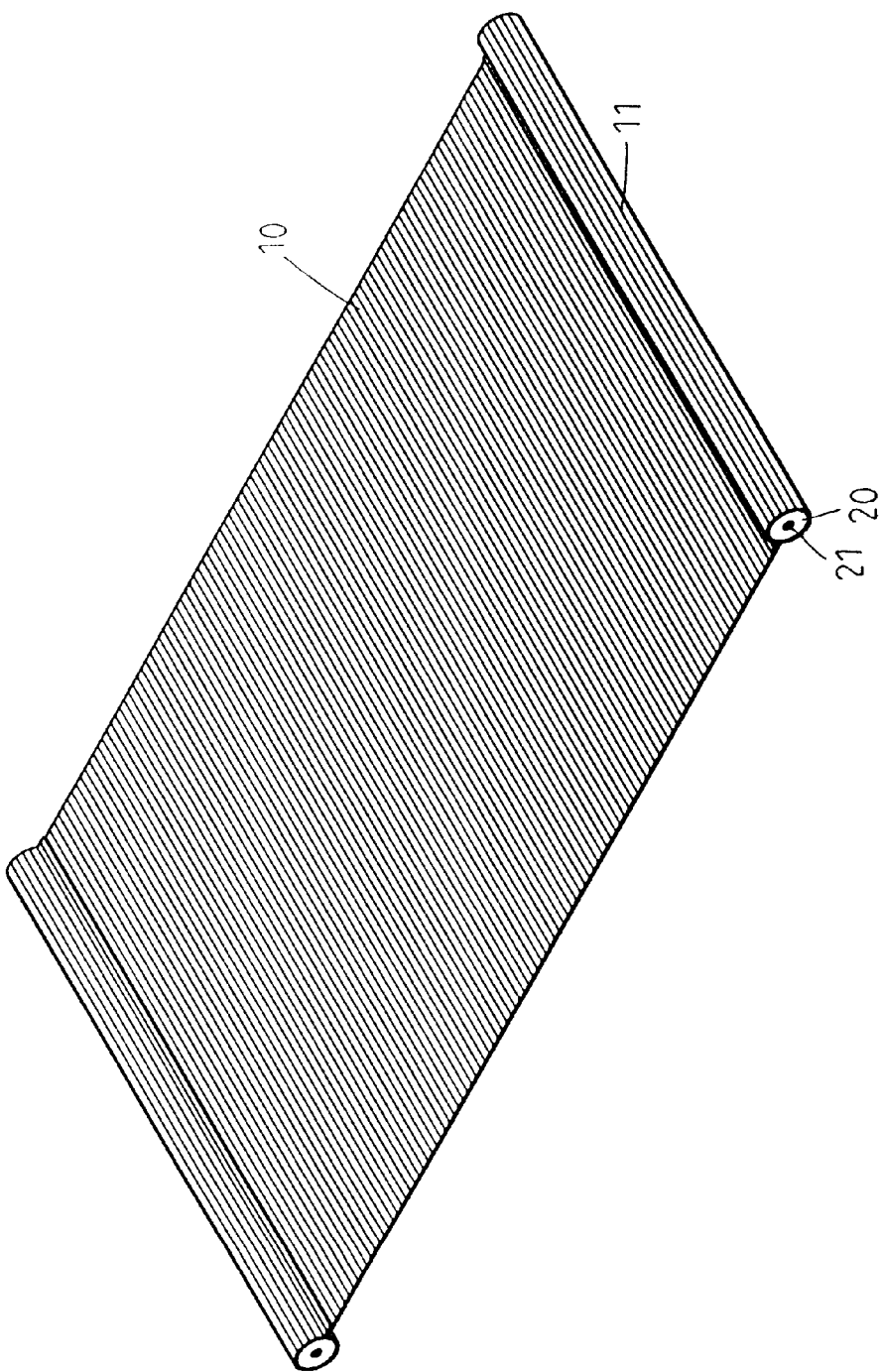
FIG. 9 is a perspective view of an improved flexible plate device of a fourth preferred embodiment in accordance with the present invention.

Referring to FIG. 9, a fourth improved flexible plate device comprises a plastic plate 10 and two connection rods 20. A plurality of linear grooves 11 are formed on the plastic plate 10. Each of the connection rods 20 is enclosed by a respective end of the plastic plate 10. Each of the connection rods 20 has a round cross-section. Each of the connection rods 20 has a threaded hole 21.

The present invention is not limited to the above embodiments but various modification thereof may be made.

I claim:

1. An improved flexible plate device comprises
   a plastic plate and two connection bars,
   a plurality of linear grooves formed on the plastic plate,
   each of the connection bars enclosed by a respective end of the plastic plate, and
   each of the connection bars having a threaded hole.

2. An improved flexible plate device as claimed in claim 1, wherein each of the connection bars (20) has a triangular cross-section.

3. An improved flexible plate device as claimed in claim 1, wherein each of the connection bars (20) has a square cross-section.

4. An improved flexible plate device as claimed in claim 1, wherein each of the connection bars (20) has a round cross-section.

* * * * *